G. Haneline.
Animal Trap.

Nº 93,633.  Patented Aug. 10, 1869.

Witnesses:
J. H. Bunier
D. L. Humphrey

Inventor:
G. Haneline

United States Patent Office.

GEORGE HANELINE, OF AKRON, OHIO.

Letters Patent No. 93,533, dated August 10, 1869.

IMPROVEMENT IN ANIMAL-TRAP.

The Schedule referred to in these Letters Patent and making part of the same

*To all whom it may concern:*

Be it known that I, GEORGE HANELINE, of Akron, in the county of Summit, and State of Ohio, have invented certain new and useful Improvements in an Animal-Trap; and I do hereby declare that the following is a full and complete description of the same, reference being had to the accompanying drawings, making part of this specification, in which—

Figure 1:
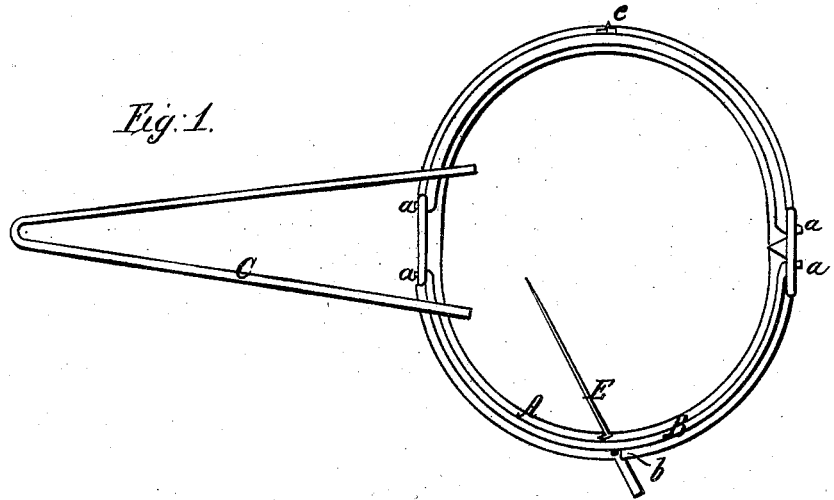

Figure 1 is a top view of the trap unset.

Figure 2:
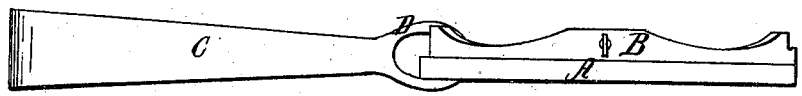

Figure 2, a side view of the same.

Figure 3:
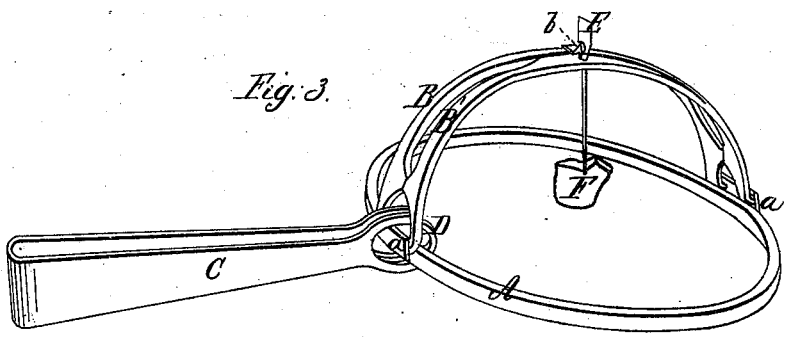

Figure 3, a perspective view of the trap when set.

Like letters of reference refer to like parts in the different views.

This invention relates to a steel-trap, so constructed that the falls or jaws fall down upon the animal instead of being sprung upward, thereby rendering said trap more certain in its purpose than the ordinary steel or gin-trap.

In fig. 3, A represents the base or ring of the trap, to which the jaws or falls B B' are pivoted at the points $a$, as shown in fig. 1.

Said jaws, as will be seen, are semicircular in figure, and corresponding in size to the ring A, to which they are pivoted, and on which they fall when the trap is sprung, as shown in fig. 1.

C is a spring, the extreme ends of which are formed into a loop or ring, D, through which, as will be seen, passes the ring A, and when the jaws are sprung, embraces the ends of the same, as shown in fig. 1.

In the crown of the jaw B is secured loosely a trip, E, the upper end of which forms a hook, $b$, whereas the lower end terminates in a sharp point, to which is attached the bait F.

The manner of setting this trap is as follows:

The limbs of the spring are pressed together, as shown in fig. 3, this will allow the jaws to be elevated and brought together, as shown in the drawing, and are secured in this position by the hook $b$ referred to, said hook being caught upon the outer side of the nib $e$, on the jaw B, thereby holding together the two jaws in the position as shown in fig. 3, in which it will be seen that the trip descends into the middle of the ring immediately under the upraised falls. The trap, as thus baited and set, is shown in fig. 3.

It will be obvious that the animal cannot reach the bait without coming under the uplifted jaws B, and across the ring A. Now, as the creature nibbles the bait, the hook thereby becomes dislodged from the nib, and the expansion of the springs throws down the jaws upon the back of the animal, which is instantly killed, or confined between the fall and ring.

In the ordinary spring or steel trap, the jaws throw upward, and, not unfrequently, throw the animal, if a small one, off from the trap, or it is caught by the limbs, which are either cut off, or so mutilated, that the animal tears or eats them off, and thus escapes. This, however, cannot happen to this trap, as the jaws fall down upon the animal and kill it at once, and hence this trap is much more reliable, and therefore useful.

What I claim as my improvement, and desire to secure by Letters Patent, is—

The jaws B B' and trip E, as arranged, in combination with the ring A, and operated by the spring C, in the manner substantially as described, and for the purpose set forth.

GEORGE HANELINE.

Witnesses:
J. H. BURRIDGE,
D. L. HUMPHREY.